United States Patent
Park et al.

(10) Patent No.: US 10,757,416 B2
(45) Date of Patent: Aug. 25, 2020

(54) METHOD AND DEVICE FOR ADAPTIVELY COMPRESSING IMAGE DATA

(71) Applicant: SAMSUNG ELECTRONICS CO., LTD., Suwon-si (KR)

(72) Inventors: Young-o Park, Seoul (KR); Kwang-pyo Choi, Anyang-si (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 241 days.

(21) Appl. No.: 15/307,172

(22) PCT Filed: May 1, 2015

(86) PCT No.: PCT/KR2015/004457
§ 371 (c)(1),
(2) Date: Oct. 27, 2016

(87) PCT Pub. No.: WO2015/167313
PCT Pub. Date: Nov. 5, 2015

(65) Prior Publication Data
US 2017/0054984 A1 Feb. 23, 2017

(30) Foreign Application Priority Data
May 2, 2014 (KR) .................. 10-2014-0053629

(51) Int. Cl.
*H04N 19/137* (2014.01)
*H04N 19/132* (2014.01)
(Continued)

(52) U.S. Cl.
CPC .......... *H04N 19/137* (2014.11); *H04N 19/12* (2014.11); *H04N 19/124* (2014.11); *H04N 19/132* (2014.11); *H04N 19/139* (2014.11); *H04N 19/177* (2014.11); *H04N 19/182* (2014.11); *H04N 19/184* (2014.11); *H04N 19/98* (2014.11)

(58) Field of Classification Search
None
See application file for complete search history.

(56) References Cited

U.S. PATENT DOCUMENTS 7,158,570 B2    1/2007    Nagumo et al.
7,386,174 B2    6/2008    Takahashi et al.
(Continued)

FOREIGN PATENT DOCUMENTS

CN    101325699 A    12/2008
JP    1066074 A    3/1998
(Continued)

OTHER PUBLICATIONS

Communication dated Sep. 19, 2017, from the European Patent Office in counterpart European Application No. 15785812.7.
(Continued)

*Primary Examiner* — James M Pontius
(74) *Attorney, Agent, or Firm* — Sughrue Mion, PLLC (57) ABSTRACT

Provided is a method for adaptively compressing image data. A refresh rate and a compression rate of the image data are determined based on motion information of the image data, and the image data are compressed based on the determined refresh rate and compression rate.

11 Claims, 7 Drawing Sheets

(51) Int. Cl.
*H04N 19/139* (2014.01)
*H04N 19/124* (2014.01)
*H04N 19/177* (2014.01)
*H04N 19/98* (2014.01)
*H04N 19/12* (2014.01)
*H04N 19/182* (2014.01)
*H04N 19/184* (2014.01)

(56) References Cited

U.S. PATENT DOCUMENTS

| | | | |
|---|---|---|---|
| 7,397,959 | B1 | 7/2008 | Volkoff et al. |
| 7,953,281 | B2 | 5/2011 | Yoshida et al. |
| 8,031,958 | B2 | 10/2011 | Saito et al. |
| 8,089,514 | B2 | 1/2012 | Shimizu et al. |
| 2002/0080881 | A1 | 6/2002 | Honda et al. |
| 2006/0274955 | A1 | 12/2006 | Honda et al. |
| 2008/0100598 | A1 | 5/2008 | Juenger |
| 2008/0313683 | A1 | 12/2008 | Shimizu et al. |
| 2009/0161763 | A1 | 6/2009 | Rossignol et al. |
| 2009/0252227 | A1 | 10/2009 | NepomucenoLeung et al. |
| 2010/0225640 | A1 | 9/2010 | Vieri et al. |
| 2013/0265294 | A1* | 10/2013 | Kim .................. G09G 3/20 345/214 |

FOREIGN PATENT DOCUMENTS

| | | |
|---|---|---|
| JP | 11298890 A | 10/1999 |
| JP | 2002335530 A | 11/2002 |
| JP | 2004023670 A | 1/2004 |
| JP | 2004193990 A | 7/2004 |
| JP | 2006109266 A | 4/2006 |
| JP | 2008311831 A | 12/2008 |
| JP | 2011-50104 A | 3/2011 |
| JP | 2012105128 A | 5/2012 |
| KR | 10-2003-0018042 A | 3/2003 |
| KR | 10-2006-0109828 A | 10/2006 |
| KR | 10-2007-0090165 A | 9/2007 |
| KR | 10-2011-0125261 A | 11/2011 |
| WO | 03005696 A2 | 1/2003 |

OTHER PUBLICATIONS

Communication dated Nov. 7, 2017, from the Japanese Patent Office in counterpart application No. 2016-563810.
Communication dated May 15, 2018, issued by the Japanese Patent Office in counterpart Japanese Application No. 2016-563810.
Communication dated May 31, 2018, issued by the European Patent Office in counterpart European Application No. 15785812.7.
International Search Report dated Aug. 3, 2015 issued by International Searching Authority in counterpart International Application No. PCT/KR2015/004457.
Written Opinion dated Aug. 3, 2015 issued by International Searching Authority in counterpart International Application No. PCT/KR2015/004457.
Communication dated Sep. 29, 2018 issued by the State Intellectual Property Office of P.R. China in counterpart Chinese Application No. 201580022559.7.

* cited by examiner

| COLOR | COLOR INDEX |
|---|---|
| C1 | 0 0 0 0 0 0 |
| C2 | 0 0 0 0 0 1 |
| C3 ⋮ | ⋮ |
| $C(2^n)$ | 1 1 1 1 1 1 |

METHOD AND DEVICE FOR ADAPTIVELY COMPRESSING IMAGE DATA

CROSS-REFERENCE TO RELATED APPLICATIONS

This is a National Stage Entry of International Application No. PCT/KR2015/004457 filed May 1, 2015, which claims priority from Korean Patent Application No. 10-2014-0053629 filed May 2, 2014, the contents of all of which are incorporated herein by reference in their entirety.

TECHNICAL FIELD

The inventive concept relates to a method for setting a refresh rate and a compression rate of an image displayed in an image processing device.

BACKGROUND ART

Recently, mobile devices such as smartphones or tablet personal computers (PCs) capable of using multimedia content have increased. In general, a display panel consumes the most power among the components constituting a mobile device. Also, there is an increasing need to efficiently manage an image data display method along with an increase in the percentage of using image data requiring high power consumption in a mobile device.

DETAILED DESCRIPTION OF THE INVENTION

Technical Problem

The inventive concept is to adaptively change a refresh rate and a compression method of displayed image data.

Technical Solution

According to embodiments of the inventive concept, the refresh rate and the compression method of the image data are adaptively changed based on the motion of the displayed image data.

Advantageous Effects of the Invention

According to the embodiments of the inventive concept, by using the human visual characteristics, the overall data traffic may be maintained at a certain level while maintaining a relatively good image quality.

BEST MODE

According to an embodiment, a method for adaptively compressing image data includes: determining a refresh rate and a compression rate of the image data based on motion information of the image data; and compressing and outputting the image data based on the determined refresh rate and compression rate.

According to an embodiment, a device for adaptively compressing image data includes: a compression rate determining unit determining a refresh rate and a compression rate of the image data based on motion information of the image data; and an image data compressing unit compressing the image data based on the determined refresh rate and compression rate.

MODE OF THE INVENTION

The terms used in the specification will be briefly described, and then the inventive concept will be described in detail.

The terms used in this specification are those general terms currently widely used in the art in consideration of functions in regard to the inventive concept, but the terms may vary according to the intention of those of ordinary skill in the art, precedents, or new technology in the art. Also, specified terms may be selected by the applicant, and in this case, the detailed meaning thereof will be described in the detailed description of the inventive concept. Thus, the terms used in the specification should be understood not as simple names but based on the meaning of the terms and the overall description of the inventive concept.

When something "comprises" or "includes" a component, another component may be further included unless specified otherwise. Also, as used herein, the terms "units" and "modules" may refer to units that perform at least one function or operation, and the units may be implemented as hardware or software or a combination of hardware and software.

Throughout the specification, the term "application" may refer to a set of computer programs for performing particular operations. The applications described herein may vary according to various embodiments. For example, the applications may include, but are not limited to, Web browsers, camera applications, dictionary applications, translation applications, data transmission applications, music player applications, video player applications, message applications, social communicator applications, social media applications, map applications, photo management applications, broadcast applications, game applications, exercise support applications, payment applications, memo applications, calendar applications, and phone book applications.

Hereinafter, embodiments of the inventive concept will be described in detail with reference to the accompanying drawings.

Figure 1:
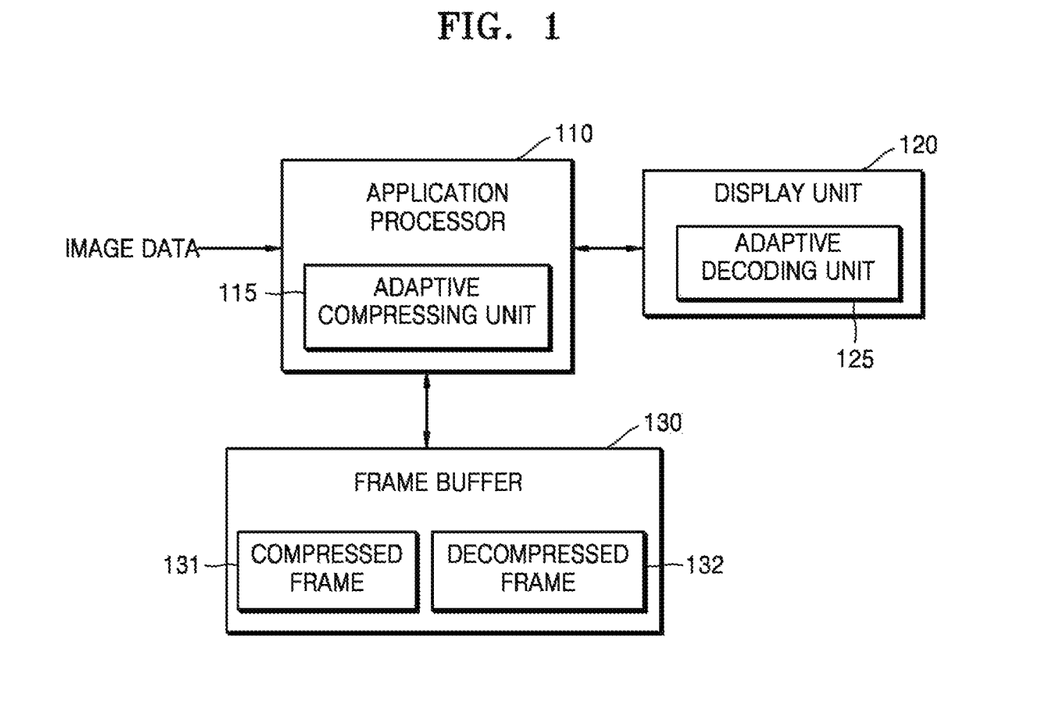
FIG. 1 is a diagram illustrating an image data processing device according to an embodiment of the inventive concept.

FIG. 1 is a diagram illustrating an image data processing device according to an embodiment of the inventive concept. An image data processing device 100 according to an embodiment of the inventive concept may be implemented in various forms. For example, the image data processing device 100 may include, but is not limited to, mobile phones, smart phones, notebook computers (laptop computers), tablet personal computers (PCs), e-book terminals, digital broadcasting terminals, personal digital assistants (PDAs), portable multimedia players (PMPs), navigation devices, MP3 players, digital cameras, and wearable devices (e.g., eyeglasses and wristwatches).

Referring to FIG. 1, the image data processing device 100 according to an embodiment of the inventive concept includes an application processor 110, a display unit 120, and a frame buffer 130.

The application processor 110 receives image data and decodes the image data to generate an image frame. The image data received by the application processor 110 may be image data compressed by various compression methods such as MPEG-2, H.264/AVC, and HEVC (High Efficiency Video Codec). The image data may be data stored in a memory device provided in the image data processing device 100 separately from the frame buffer 130. The application processor 110 decodes the received image data and restores a pixel value of the image frame. A decompressed frame 132, which is a restored original image frame, is stored in the frame buffer 130. Also, the application processor 110 stores a compressed frame 131, which is obtained by compressing the decompressed frame 132, in the frame buffer 130.

The frame buffer 130 is a memory device that temporarily stores information of an image frame displayed on the display unit 120. The image frame processed by the application processor 110 is stored in the frame buffer 130. The frame buffer 130 stores data of an image frame in units of pixels. That is, the frame buffer 130 includes a plurality of memory units corresponding to each pixel displayed on the display unit 120, and the image frame information stored in the frame buffer 130 is displayed on the display unit 120 as it is. The frame buffer 130 should have a storage space capable of storing at least one image frame.

The application processor 110 and the display unit 120 are connected through a data bus, and the application processor 110 transmits data of the compressed frame 131 or the decompressed frame 132 stored in the frame buffer 130 to the display unit 120. The display unit 120 includes a display panel such as PDP, LCD, or LED, a panel driving unit for driving the display panel, and an adaptive decoding unit 125 for decoding the compressed image data transmitted from the application processor 110. The image data output from the application processor 110 may include data of each pixel matched to the X, Y coordinates of the display panel of the display unit 120, and the data of each pixel may include a plurality of color components. For example, each pixel data may include may include a plurality of color components of red (R), green (G), and blue (B). In the case of true colors, each of R, G, and B may have 1 byte, that is, 8 bits, and each pixel data of the decompressed frame 132, which is the original image data, may have a total of 24 bits.

The size of the original image data is generally large. Thus, a data transmission rate may be restricted in consideration of the bandwidth of the data bus between the application processor 110 and the display unit 120. Also, even when the bandwidth of the data bus is sufficient, the data transmission rate between the application processor 110 and the display unit 120 may be restricted in order to prevent power consumption.

According to an embodiment, an adaptive compressing unit 115 provided in the application processor 110 adjusts a refresh rate and a compression rate of the image data based on motion information of the image data. The refresh rate refers to the number of image frames output for 1 second (frame/sec). The compression rate refers to (the data size of the compressed image frame)/(the data size of the original image frame). For example, when the compression rate is 1, the original image frame data size and the compressed image frame data size are equal to each other, and when the compression rate is ¼, the compressed image frame data size is ¼ of the original image frame data size. That is, as the compression rate value decreases, the compressed image frame data size decreases with respect to the original image frame data size. Therefore, as the compression rate value decreases, more compression is performed on the image data. In the following description, the compression rate has a value of 0 to 1. As the compression rate value is closer to 0, the compression rate is higher. For example, a compression rate of ¼ represents a higher compression rate than a compression rate of ½.

The adaptive compressing unit 115 determines a refresh rate inversely proportional to a motion of the image data and a compression rate proportional to the motion based on the motion information and compresses the original image frame according to the determined refresh rate and compression rate. That is, as the image motion increases, the adaptive compressing unit 115 determines a relatively small refresh rate and a relatively great compression rate and compresses the original image frame according to the determined refresh rate and compression rate. When there is a large motion in the image, the human vision may not relatively easily recognize an image quality degradation. Also, when there is a small motion in the image, the human vision may easily recognize the image quality degradation. Thus, as the image motion increases, even when a relatively small refresh rate and a relatively great compression rate are used to compress the image data, the image quality degradation recognized by the human vision is not large. Also, the data transmission rate has a value of (the refresh rate)*(the data size of one frame). Thus, a data band may be efficiently used by compressing the image data according to a refresh rate inversely proportional to a motion of the image data and a compression rate proportional to the motion. The adaptive decoding unit 125 of the display unit 120 decodes the compressed image data output from the adaptive compressing unit 115.

Hereinafter, a method of determining the refresh rate and the compression rate of the image data by the adaptive compressing unit 115 of FIG. 1 will be described in detail.

Figure 2:
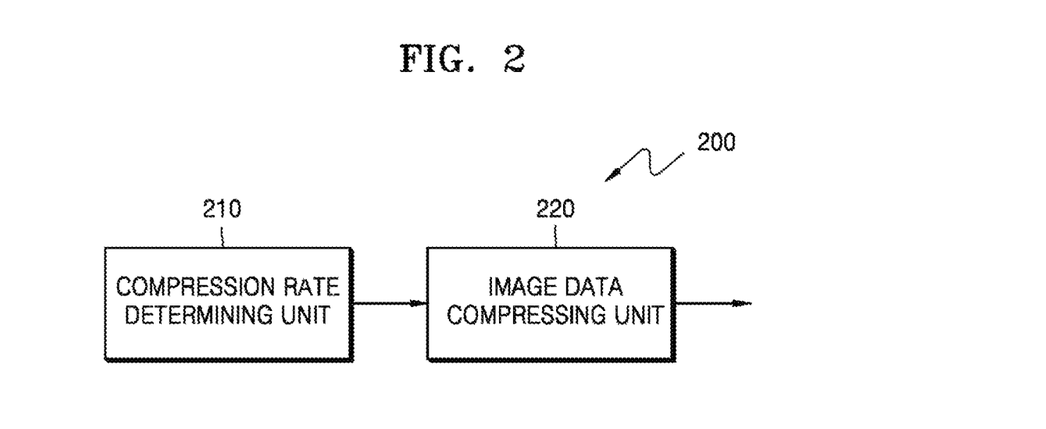
FIG. 2 is a block diagram illustrating a configuration of an adaptive image data compressing device according to an embodiment.
Figure 3:
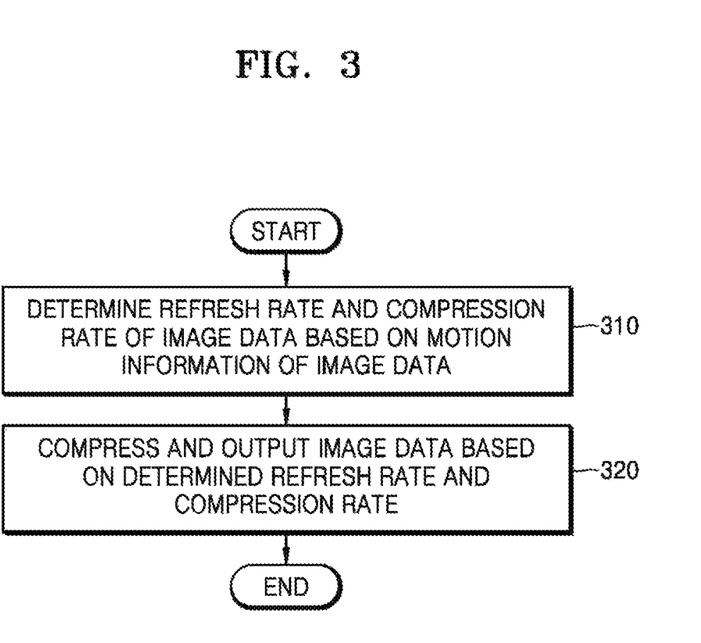
FIG. 3 is a flow chart illustrating an adaptive image data compressing method according to an embodiment.

FIG. 2 is a block diagram illustrating a configuration of an adaptive image data compressing device according to an embodiment. FIG. 3 is a flow chart illustrating an adaptive image data compressing method according to an embodiment. An adaptive image data compressing device 200 of FIG. 2 corresponds to the adaptive compressing unit 115 of FIG. 1.

Referring to FIGS. 2 and 3, in operation 310, a compression rate determining unit 210 determines a refresh rate and a compression rate of image data based on motion information of the image data.

The motion information of the image data may be determined in various ways. For example, when the current image data is data about a screen image displayed on a screen by being executed by a predetermined application, the compression rate determining unit 210 may determine motion information of the image based on an application type. Application type information may be received through index information representing a currently-executed application. When the currently-executed application is an application displaying mainly a still image or text-based data, such as an Internet browser, a text reader, an e-book reader, a still image viewer, an office program, or a word processor, the compression rate determining unit 210 may determine that the current image data has a small motion. Also, when the currently-executed application is an application displaying mainly large-motion data, such as a video player, the compression rate determining unit 210 may determine that the current image data has a medium motion. Also, when the currently-executed application is an application performing frequent transition, such as a game application, the compression rate determining unit 210 may determine that the current image data has a large motion. The compression rate determining unit 210 may pre-classify motion levels according to application types, pre-table and store the motion information as illustrated in Table 1 below, and determine the motion information of the image data.

TABLE 1

| Motion Level | Relevant Application |
| --- | --- |
| First Motion (No Motion) | Internet Browser, Text Reader, E-book Reader, Still Image Viewer, Office Program, Word Processor |
| Second Motion (Medium Motion) | Video Player, Internet Browser Including Moving Images |
| Third Motion (Large Motion) | Game |

A method of determining the motion levels according to the application types may be modified without being limited to Table 1. Hereinafter, for convenience, a description will be given mainly of a case where the image data is broadly classified into three stages according to the motion levels, such that the image data is classified into first image data having a small motion, second image data having a medium motion, and third image data having a large motion. However, the image data is not limited thereto and may be classified in a subdivided manner according to the motion levels.

The compression rate determining unit 210 may determine the motion level by analyzing the image data. For example, the compression rate determining unit 210 may acquire a motion vector of blocks included in image frames input for a predetermined time, generate a histogram of motion information according to a size of the motion vector, and determine a motion level included in image data according to a size ratio of the motion vector. However, a method of determining the motion level included in the image data is not limited thereto and may be implemented variously.

When the image data is classified according to the motion level, the compression rate determining unit 210 determines a refresh rate and a compression rate to be applied to the classified image data. When the image data is classified into the first to third image data according to the motion levels of the image data as described above, the compression rate determining unit 210 may determine the refresh rate and the compression rate, which are to be applied to the classified image data, as in Table 2 below.

TABLE 2

| | Refresh Rate | Compression Rate |
| --- | --- | --- |
| First Image Data | 10 Hz | 1 |
| Second Image Data | 30 Hz | 1/4 |
| Third Image Data | 60 Hz | 1/8 |

As illustrated in Table 2, the compression rate determining unit 210 determines a first refresh rate having a lowest refresh rate and a first compression rate having a lowest compression rate for the first image data, a second refresh rate having a medium refresh rate and a second compression rate having a medium compression rate for the second image data, and a third refresh rate having a highest refresh rate and a third compression rate having a highest compression rate for the third image data. Without being limited to Table 2, the compression rate determining unit 210 may set the refresh rate inversely proportional to the motion of the image data and the compression rate proportional to the motion of the image data.

In operation 320, an image data compressing unit 220 compresses the image data according to the determined refresh rate and compression rate.

Figure 4:
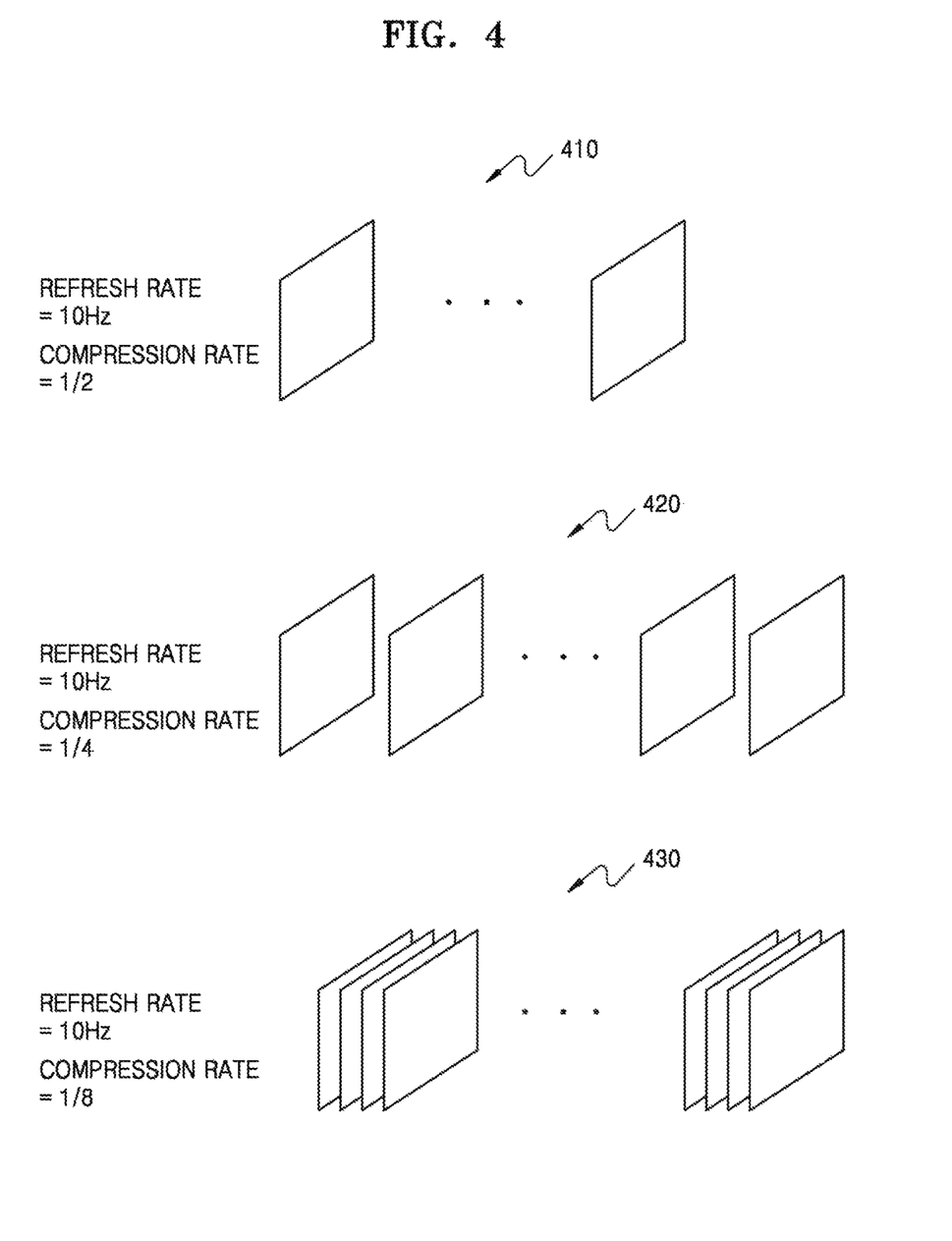
FIG. 4 is a reference diagram illustrating a refresh rate and a compression rate, which are applied to image data classified according to motion levels, according to an embodiment.

FIG. 4 is a reference diagram illustrating a refresh rate and a compression rate, which are applied to image data classified according to motion levels, according to an embodiment.

When the image data is classified according to the motion level, the image data compressing unit 220 compresses the image data according to the determined refresh rate and compression rate. When the image data is the first image data having a small motion, the refresh rate applied to the first image data is 10 Hz, and the compression rate applied thereto is 1, the image data compressing unit 220 losslessly compresses the original image frame and outputs losslessly-compressed image frames 410 at a refresh rate of 10 Hz. As an example, when the original image frame has a refresh rate of 60 Hz, that is, when the original image frame includes 60 image frames per second, the image data compressing unit 220 may sample only 10 image frames among 60 original frame frames by image dropping and compress the sampled 10 image frames by a lossless compression method. Various methods may be applied as the lossless compression method. As an example, a differential pulse code modulation (DPCM) method may be applied to losslessly compress the sampled image frame.

When the image data is the second image data having a medium motion, the refresh rate applied to the second image data is 30 Hz, and the compression rate applied thereto is ¼, the image data compressing unit 220 compresses the original image frame at a rate of ¼ and outputs compressed image frames 420 at a refresh rate of 30 Hz. In this case, the image data compressing unit 220 samples only 30 image frames among 60 original image frames by frame dropping and compresses each of the sampled 30 image frames at a rate of ¼. That is, the image frame compressing unit 220 performs compression such that the data size of each of the sampled 30 image frames has ¼ of the size of the original image frame. The compression method may be implemented by various methods such as bit truncation, bit mapping, and color indexing, which will be described later.

When the image data is the third image data having a large motion, the refresh rate applied to the third image data is 60 Hz, and the compression rate applied thereto is ⅛, the image data compressing unit 220 compresses the received original image frame at a rate of ⅛ and outputs compressed image frames 430 at a refresh rate of 60 Hz. In this case, since a frame rate of the original image frame is 60 Hz, the frame rate of the original image frame and the determined refresh rate are equal to each other. When the frame rate of the original image frame and the determined refresh rate are equal to each other, the original image frame may be used as it is, without dropping of the original image frame. When the determined refresh rate is greater than the frame rate of the original image frame, the frame rate of the compressed image data may be adjusted by interpolation or upsampling. For example, as described above, when the frame rate of the original image frame is 60 Hz and the refresh rate determined for the image data having a large motion is 120 Hz, the image data compressing unit 220 generates a image frame of 120 Hz by interpolating the original image frame, and compresses each image frame according to the determined compression rate. The compression method may be implemented by various methods such as bit truncation, bit mapping, and color indexing, which will be described later.

Figure 5:
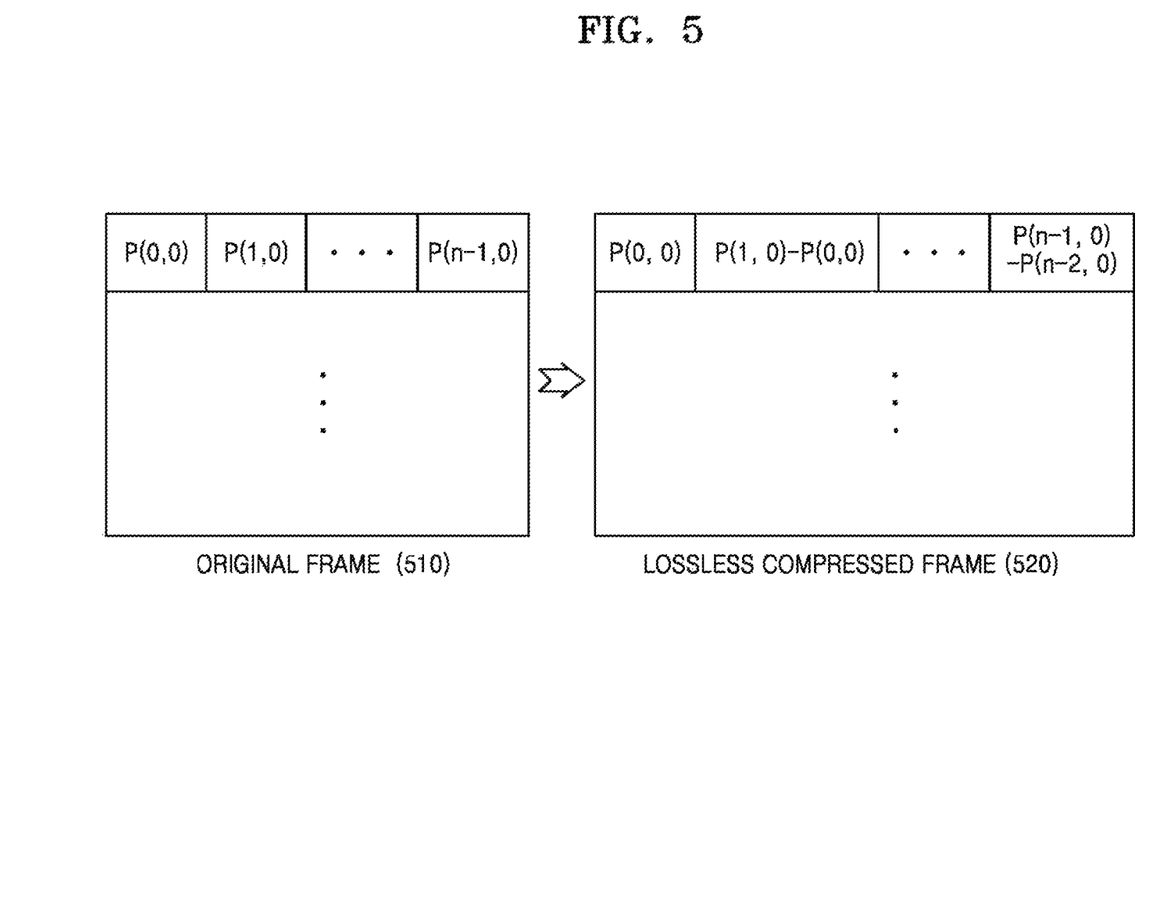
FIG. 5 is a reference diagram illustrating a lossless compression method according to an embodiment.

FIG. 5 is a reference diagram illustrating a lossless compression method according to an embodiment.

As described above, when the current image data has a small motion, the image data compressing unit 220 may reduce the refresh rate of the image data and reduce the compression rate thereof. As an example, when the motion of the image data is small, the image data may be losslessly compressed instead of being output at a relatively small refresh rate. A DPCM method is illustrated as a lossless compression method in FIG. 5.

The DPCM method calculates a differential value of a pixel value difference constituting each image frame in a row or column direction and transmits the differential value instead of a pixel value of an original pixel. As illustrated in FIG. 5, the image data compressing unit 220 calculates a pixel value difference between adjacent pixels included in a losslessly-compressed image frame. For example, instead of a pixel value P(1,0) included in an original frame 510, the image data compressing unit 220 calculates a difference value (P(1,0)-P(0,0)) from a left pixel value P(0,0) and uses the same as information of the pixel value P(1,0). In this case, an original value of the pixel value P(0,0) for reference is used as it is. In a decoding process, the pixel value P(1,0) may be restored by adding the pixel value P(0,0) and the difference value (P(1,0)-P(0,0)). In this way, the image data compressing unit 220 may generate a lossless compressed frame 520 by DPCM using the differential value between the adjacent pixels.

Figure 6:
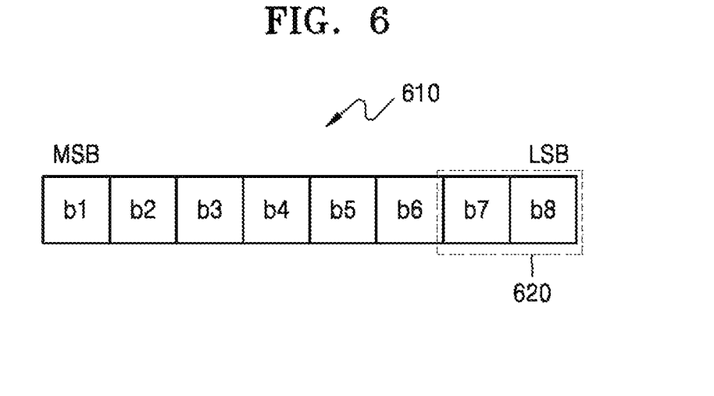
FIG. 6 is a reference diagram illustrating bit truncation according to an embodiment.

FIG. 6 is a reference diagram illustrating bit truncation according to an embodiment.

When the compression rate is determined, the image data compressing unit 220 may perform compression by bit truncation reducing a bit number of each pixel of the original image data. It is assumed that each pixel data of the original image data has RGB888 (that is, each of R, G, and B color components includes 8 bits) and thus it has a data size of a total of 24 bits. The image data compressing unit 220 may compress the 24-bit data size of an original pixel to 16 bits by truncating the bits of one pixel of the original image data such that it has RGB565 (that is, a R color component has a value of 5 bits, a G color component has a value of 6 bits, and a B color component has a value of 5 bits). In this case, the compression rate is 16/24, that is, 2/3.

Referring to FIG. 6, as illustrated, it is assumed that a binary value of one color component of one pixel includes 8 bits of b1 to b8 (610), wherein b1 is the most significant bit (MSB) and b8 is the least significant bit (LSB). The image data compressing unit 220 compresses 8-bit data to 6 bits by truncating a predetermined number of bits (620) from the LSB according to the determined compression rate and outputting only the remaining 6 bits other than the truncated bits (620). A decoding side receiving the truncated image data may perform decoding by inserting 0 into a truncated binary value portion. The number of truncated bits may be determined according to the compression rate. For example, when the compression rate is 1/M (M is an integer), the total bit number of one pixel of the original image data is T (T is an integer), and the number of truncated bits is N (N is an integer), the value of N is determined such that (T—N)/T=1/M. When one pixel includes a plurality of color components, the number of bits to be truncated in each color component may be determined based on the determined truncated bit number N. As in the above example, when 24-bit pixel data is to be compressed to 16 bits to truncate a total of 8 bits, it may be set such that 3 bits are truncated in the R color component, 2 bits are truncated in the G color component, and 2 bits are truncated in the B color component.

Figure 7:
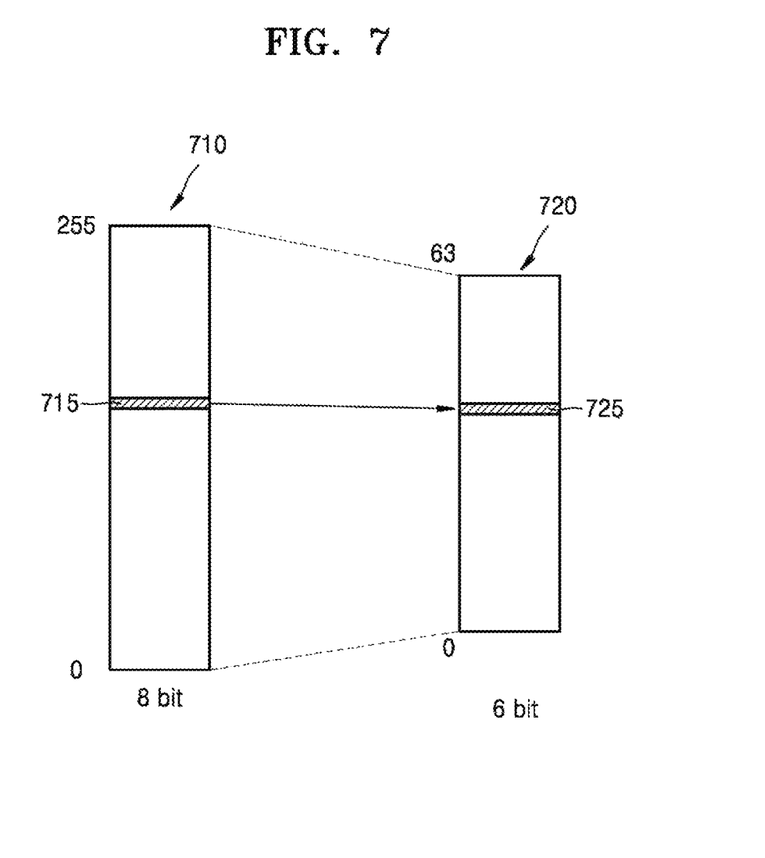
FIG. 7 is a reference diagram illustrating an image data compressing method using a bit mapping method according to an embodiment.

FIG. 7 is a reference diagram illustrating an image data compressing method using a bit mapping method according to an embodiment.

The image data compressing unit 220 may compress the image data by the bit mapping method instead of by the bit truncation method. For example, when a pixel of the original image frame is represented by 8 bits, the pixel has one of a total of 256 (0~255) color components. When an 8-bit pixel is compressed to 6 bits, 64 (0~63) color components may be represented by a 6-bit pixel value. The image data compressing unit 220 may compress the image data by mapping a color component 715 of the current pixel of the original image frame represented by 8 bits to a color component 725 among the color components representable by 6 bits and outputting a 6-bit value corresponding to the color component 725.

Figure 8:
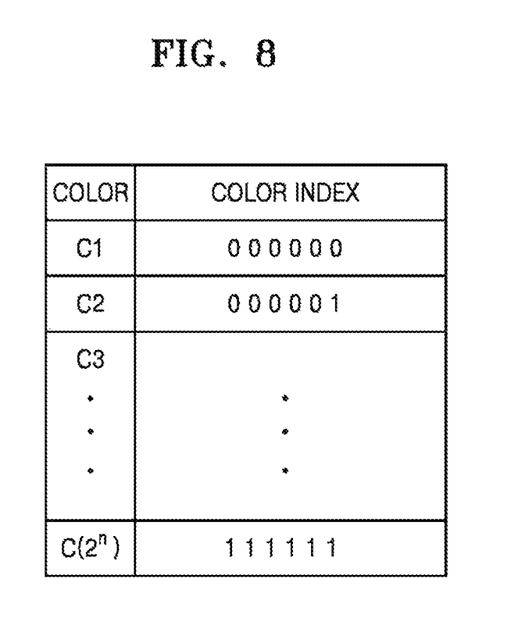
FIG. 8 is a reference diagram illustrating an image data compressing method using a color index method according to an embodiment.

FIG. 8 is a reference diagram illustrating an image data compressing method using a color index method according to an embodiment.

When the bit number usable to represent one pixel of the image data is determined according to the compression rate, the image data compressing unit 220 may compress the image data by determining the colors representable by using the determined bit number and outputting a binary value representing an index corresponding to the color of each pixel.

It is assumed that the bit number usable to represent one pixel of the image data compressed according to the compression rate is n (integer). Except the case where the compression rate is 1, "n" should be smaller than the bit number of one pixel of the original image frame. $2^n$ colors representable by using n bits are referred to as C1 to C($2^n$). The image data compressing unit 220 determines the color closest to the color of the current pixel among the $2^n$ colors and outputs an n-bit color index representing the determined color. In other words, the image data compressing unit 220 may compress the image data by constructing a color palette including $2^n$ colors and outputting n-bit index information representing one color included in the color palette.

The image data compressing unit 220 compresses the original image frame according to the determined compression rate by using the above various compression methods. As an example, the image data compressing unit 220 applies DPCM to perform lossless compression on the first image data having a small motion. Also, the image data compressing unit 220 may perform compression on the second image data having a medium motion by truncating a bit of a binary value of at least one of a plurality of color components constituting each pixel such that the total bit number is smaller than the bit number of the pixel of the original image frame. That is, when the original image data includes three color components, binary values of three color components of a pixel of the original image data are respectively A, B, and C (integers), and a bit number of all the three color components of the pixel is M (integer), the image data compressing unit 220 may perform compression on the second image data by truncating a bit of a binary value of at least one of A, B, and C such that a total bit number "m (integer)" of a pixel of the second image data is smaller than M. Also, the image data compressing unit 220 may perform compression on the third image data having a large motion by using the color indexing method using the color palette. That is, the image data compressing unit 220 may compress the third image data by mapping the color of the original image data to one of the 2^ n colors representable by a bit number "n (integer)" smaller than "m" and outputting a color index value including "n" bits.

Figure 9:
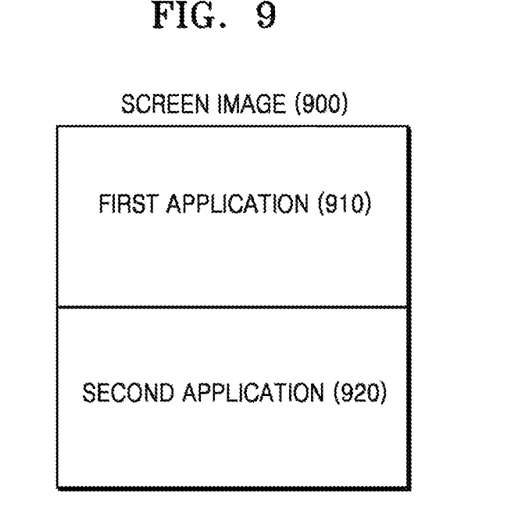
FIG. 9 is a reference diagram illustrating a method of determining motion information of image data according to an embodiment.

FIG. 9 is a reference diagram illustrating a method of determining motion information of image data according to an embodiment.

As described above, the compression rate determining unit 210 may determine the motion information of the image data based on the type of an application displaying the image data. However, in some cases, a plurality of applications may be simultaneously displayed in a screen image 900. For example, as illustrated in FIG. 9, a first application 910 and a second application 920, which are of different types, may be displayed in the screen image 900. When a plurality of applications (910 and 920) should be displayed in the screen image 900, the compression rate determining unit 210 may determine the compression rate based on the application having the largest motion among the plurality of applications. For example, when the first application 910 is an Internet browser having a small motion and the second application 920 is a video player, the compression rate determining unit 210 may determine that the entire screen image 900 is a large-motion image, based on the motion information of the second application 920 having a large motion.

Figure 10:
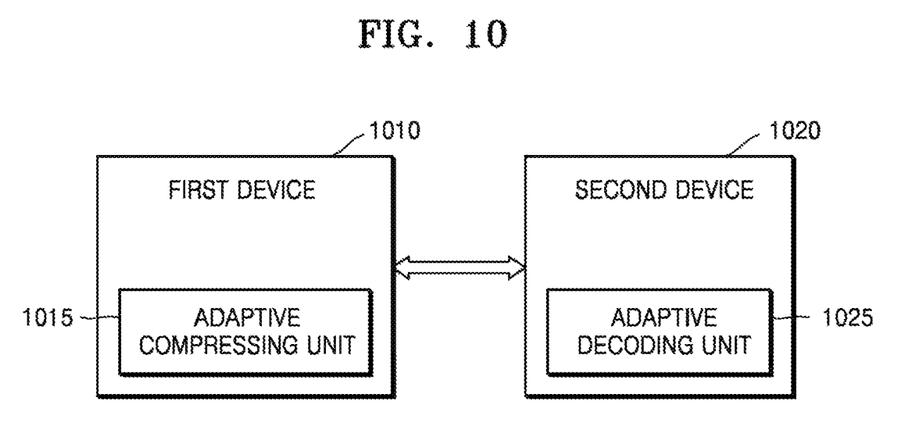
FIG. 10 is a diagram illustrating an image data transmitting/receiving system according to an embodiment.

FIG. 10 is a diagram illustrating an image data transmitting/receiving system according to an embodiment.

Referring to FIG. 10, an image data transmitting/receiving system according to an embodiment may include a transmitting device transmitting image data and a receiving device receiving and displaying the image data. The transmitting device transmitting the image data will be referred to as a first device 1010, and the receiving device receiving and displaying the image data will be referred to as a second device 1020.

According to an embodiment of the inventive concept, the first device 1010 may include at least one communication module for communicating with the second device 1020. For example, the first device 1010 may include, but is not limited to, mobile communication modules (e.g., 3G, 4G, or 5G), short-range communication modules (e.g., Bluetooth communication modules, BLE (Bluetooth Low Energy) communication modules, WiFi communication modules, Zigbee communication modules, IrDA (Infrared Data Association) communication modules, WFD (Wi-Fi Direct) communication modules, UWB (Ultra Wideband) communication modules, or Ant+ communication modules), or home network communication modules.

The first device 1010 according to an embodiment of the inventive concept may be implemented in various forms. For example, the first device 1010 described herein may include, but is not limited to, mobile phones, smart phones, notebook computers (laptop computers), tablet personal computers (PCs), e-book terminals, digital broadcasting terminals, personal digital assistants (PDAs), portable multimedia players (PMPs), navigation devices, MP3 players, digital cameras, and wearable devices (e.g., eyeglasses and wristwatches).

The second device 1020 may include at least one communication module for receiving the image data transmitted from the first device 1010 For example, the second device 1020 may include, but is not limited to, mobile communication modules (e.g., 3G, 4G, or 5G), short-range communication modules (e.g., Bluetooth communication modules, BLE (Bluetooth Low Energy) communication modules, WiFi communication modules, Zigbee communication modules, IrDA (Infrared Data Association) communication modules, WFD (Wi-Fi Direct) communication modules, UWB (Ultra Wideband) communication modules, or Ant+ communication modules), or home network communication modules.

According to an embodiment of the inventive concept, the second device 1020 may be various types of devices having a display function. For example, the second device 1020 may include, but is not limited to, mobile phones, smart phones, notebook computers (laptop computers), tablet personal computers (PCs), e-book terminals, digital broadcasting terminals, personal digital assistants (PDAs), portable multimedia players (PMPs), audio devices, navigation devices, MP3 players, digital cameras, smart televisions (TVs), eyeglasses, wristwatches, home sync, air conditioners, water purifiers, and refrigerators having a communication function.

The first device 1010 may perform a similar function to the image data compressing device 200 of FIG. 2. That is, like the image data compressing device 200 of FIG. 2, an adaptive compressing unit 1015 of the first device 1010 determines the refresh rate and the compression rate based on the motion information of the input image data, compresses the image data according to the determined refresh rate and compression rate, and outputs the compressed image data to the second device 1020 through the communication module. An adaptive decoding unit 1025 of the second device 1020 decodes the compressed image data.

The methods according to the embodiments of the inventive concept may be stored in computer-readable recording mediums by being implemented in the form of program commands that may be performed by various computer means. The computer-readable recording mediums may include program commands, data files, and data structures either alone or in combination. The program commands may be those that are especially designed and configured for the inventive concept, or may be those that are publicly known and available to those of ordinary skill in the art of computer software. Examples of the computer-readable recording mediums may include magnetic recording mediums such as hard disks, floppy disks, and magnetic tapes, optical recording mediums such as compact disk read-only memories (CD-ROMs) and digital versatile disks (DVDs), magneto-optical recording mediums such as floptical disks, and hardware devices such as read-only memories (ROMs), random-access memories (RAMs), and flash memories that are especially configured to store and execute program commands. Examples of the program commands may include machine language codes created by compilers, and high-level language codes that may be executed by computers by using interpreters.

Although the embodiments of the inventive concept have been described above in detail, the scope of the inventive concept is not limited thereto and those of ordinary skill in the art will understand that various modifications and improvements may be made therein without departing from the spirit and scope of the inventive concept as defined by the following claims.

The invention claimed is:

1. A method, executed by at least one processor, for adaptively compressing image data, the method comprising:
determining, by the at least one processor, both a refresh rate and a compression rate of the image data based on motion information of the image data; and
compressing, by the at least one processor, the image data based on the determined compression rate and outputting, by the at least one processor, the compressed image data based on the determined refresh rate,
wherein a value of the refresh rate is determined to be proportional to a motion of the image data and a value of the compression rate is determined to be inversely proportional to the motion of the image data,
wherein the determining comprises:
classifying, based on the motion information of the image data, the image data into first image data having a small motion, second image data having a medium motion, and third image data having a large motion; and
determining a first refresh rate having a lowest refresh rate and a first compression rate having a lowest compression rate for the first image data, a second refresh rate having a medium refresh rate and a second compression rate having a medium compression rate for the second image data, and a third refresh rate having a highest refresh rate and a third compression rate having a highest compression rate for the third image data.

2. The method of claim 1, wherein the first image data is compressed by lossless compression, the second image data is compressed by bit truncation reducing a bit number of a pixel of original image data, and the third image data is compressed by a color index table.

3. The method of claim 2, wherein, when the original image data comprises three color components, binary values of three color components of a pixel of the original image data are respectively A, B, and C, which are integers, and a bit number of all the three color components of the pixel is M, which is an integer, the second image data is compressed by truncating a bit of a binary value of at least one of A, B, and C such that a total bit number "m", which is an integer, of a pixel of the second image data is smaller than M; and
the third image data is compressed by mapping a color of the original image data to one of $2^n$ colors representable by a bit number "n", which is an integer, smaller than "m" and outputting a color index value comprising "n" bits.

4. The method of claim 1, wherein the image data is a screen image displayed on a screen by being executed by an application, and the motion information of the image data is determined based on a type of the application.

5. The method of claim 4, wherein the type of the application is classified into a first application having a small motion, a second application having a medium motion, and a third application having a large motion, according to a type of image data that is mainly output during execution of the application among a still image, a text, and a moving image.

6. The method of claim 4, wherein, when a plurality of applications are included in the screen image displayed on the screen, the compression rate is determined based on the application having a largest motion among the plurality of applications.

7. A device for adaptively compressing image data, the device comprising:
at least one processor; and
a memory storing a program which is executed by the at least one processor to cause the at least one processor to:
determine both a refresh rate and a compression rate of the image data based on motion information of the image data; and
compress the image data based on the determined compression rate and output the compressed image data based on the determined refresh rate,
wherein a value of the refresh rate is determined to be proportional to a motion of the image data and a value of the compression rate is determined to be inversely proportional to the motion of the image data,
wherein the at least one processor classifies, based on the motion information of the image data, the image data into first image data having a small motion, second image data having a medium motion, and third image data having a large motion, determines a first refresh rate having a lowest refresh rate and a first compression rate having a lowest compression rate for the first image data, a second refresh rate having a medium refresh rate and a second compression rate highest refresh rate and a third compression rate having a highest compression rate for the third image data.

8. The device of claim 7, wherein the first image data is compressed by lossless compression, the second image data is compressed by bit truncation reducing a bit number of a pixel of original image data, and the third image data is compressed by a color index table.

9. The device of claim 8, wherein, when the original image data comprises three color components, binary values of three color components of a pixel of the original image data are respectively A, B, and C, which are integers, and a bit number of all the three color components of the pixel is M, which is an integer, the second image data is compressed by truncating a bit of a binary value of at least one of A, B, and C such that a total bit number "m", which is an integer, of a pixel of the second image data is smaller than M; and
the third image data is compressed by mapping a color of the original image data to one of $2^n$ colors representable by a bit number "n", which is an integer, smaller than "m" and outputting a color index value comprising "n" bits.

10. The device of claim 7, wherein the image data is a screen image displayed on a screen by being executed by an application, and the motion information of the image data is determined based on a type of the application.

11. The device of claim 10, wherein the type of the application is classified into a first application having a small motion, a second application having a medium motion, and a third application having a large motion, according to a type of image data that is mainly output during execution of the application among a still image, a text, and a moving image.

* * * * *